United States Patent [19]

Heldmann et al.

[11] 4,116,572

[45] Sep. 26, 1978

[54] SHAFT CLAMPING DEVICE

[75] Inventors: Ernest J. Heldmann, Wethersfield; Terry D. Capuano, New Britain, both of Conn.

[73] Assignee: Veeder Industries Inc., Hartford, Conn.

[21] Appl. No.: 803,788

[22] Filed: Jun. 6, 1977

[51] Int. Cl.$^2$ .............................................. F16D 1/06
[52] U.S. Cl. ........................................ 403/7; 403/41; 403/344
[58] Field of Search ................ 403/344, 373, 312, 41, 403/7; 85/9 R; 24/135 K, 279

[56] References Cited

U.S. PATENT DOCUMENTS

| 895,397 | 8/1908 | Brazelle ............................ 24/135 K |
| 1,885,231 | 11/1932 | Chong et al. ........................ 85/9 R |
| 1,914,516 | 6/1933 | MacPherson ........................ 85/9 R |
| 3,109,663 | 11/1963 | Phillips, Jr. ........................ 24/279 |
| 3,868,193 | 2/1975 | Schott .............................. 403/344 |
| 3,917,424 | 11/1975 | Zugel .............................. 403/287 |

FOREIGN PATENT DOCUMENTS

| 1,403,471 | 5/1965 | France ............................. 24/279 |
| 98,135 | 3/1923 | Switzerland ....................... 403/344 |
| 581,104 | 10/1946 | United Kingdom .................. 85/9 R |

Primary Examiner—Andrew V. Kundrat
Attorney, Agent, or Firm—Prutzman, Hayes, Kalb & Chilton

[57] ABSTRACT

A shaft clamping device is disclosed comprising an annular collar having a radial through slot. The collar has a recess and a coaxially aligned tapped opening respectively formed on opposite sides of the slot and which cooperate with a clamping screw for expanding or contracting the diameter of a clamping surface defined by the center opening of the collar. The collar recess includes a tapered diameter surface between an enlarged entrance of the recess and a clearance hole therein to provide a clamping screw bearing shoulder for seating a tapered diameter bearing surface of the clamping screw and providing for reduced stress concentration in a clamping collar of increased strength.

7 Claims, 2 Drawing Figures

SHAFT CLAMPING DEVICE

BACKGROUND AND SUMMARY OF THE INVENTION

This invention relates to an improvement in a shaft clamping device and particularly to a shaft clamping collar of a type adapted to grip a shaft without marring or otherwise damaging its surface. This type of shaft clamping device usually provides substantially greater holding power than set screw type shaft collars.

To obtain normally required high holding power while utilizing a collar having a relatively small outside diameter to save material, split type shaft couplings or collars utilizing cap screws for the clamping force conventionally permit the head of the cap screw(s) to extend past the outer periphery of the coupling or collar. This practice, however, can result in a safety hazard when the collar is used as a power transmitting device that is unshielded.

If space is not critical in a particular application, and added cost can be tolerated, a collar having an oversized outside diameter can be used. However, normally, both space and cost are significant considerations. Where space is critical and high holding power is required, as in a transmission application, an oversized outside diameter collar likely will not fit; a standard size collar specified for the specific applied load may require extra clearance to accommodate the standard screw head extending beyond the periphery of a standard collar which may well be prohibitive and thus require the portion of the screw head extending past the collar to be ground away. This practice makes loosening or removal of such a clamping device extremely difficult.

To resolve such problems, efforts have been made using differential clamping screws, e.g., for expanding and contracting the diameter of the clamping surface of a collar such as illustrated in U.S. Pat. No. 3,876,318 issued Apr. 8, 1975 to Corey F. Crispell. Such constructions, however, are expensive.

Other efforts have been made to provide shaft clamping devices, such as illustrated in U.S. Pat. No. 3,917,424 issued Nov. 4, 1975 to Martin J. Zugel, wherein the head of the clamping screw is encompassed within the outer wall of the collar. It has been the applicant's experience that when such constructions are used in a collar of relatively small outside diameter to save material and space while providing a standard clamping screw for the required holding power, highly developed stress concentrations are experienced at the junction between the clearance hole for the clamping screw head and its bearing area, resulting in frequent failure of collars under specific applied loads.

Further efforts to overcome the above described deficiencies have included the use of clamping screws which are one or even two sizes under size. These efforts have resulted in greatly reducing the effectiveness of the clamping device and require use of significantly larger collars to hold specific loads which cannot meet dimensional limitations in certain applications.

Accordingly, it is an object of this invention to provide a new and improved shaft clamping device which achieves seemingly incompatible objectives in assuring that its clamping screw is housed entirely within the periphery of a collar which is of a smaller diametrical size relative to the size collar required to encompass a standard size screw normally specified for the required holding power of the device.

A further object of this invention is to provide a new and improved collar of the above described type having significantly increased strength and resistance to failure. Included in this object is the aim of providing such a collar particularly suited to be used with a clamping screw which when seated is maintained within the periphery of the collar which effects a holding power normally achieved only with a standard size screw which would project beyond the collar periphery.

Another object of this invention is to provide such a collar which features a junction between a screw head clearance hole in the collar and the bearing area providing for reduced stress concentration and resulting in a collar of significantly increased strength in what is normally considered its weakest region.

Other objects will be in part obvious and in part pointed out more in detail hereinafter.

These and related objects are achieved in accordance with this invention by providing a shaft clamping device which utilizes a unique resilient annular collar having a circular opening therein and a radial slot extending from the opening, the collar having a tapped opening on one side of the slot and a coaxially aligned recess on the opposite side of the slot, the recess having a relatively enlarged entrance and a relatively reduced clamping screw clearance hole, the recess further including a tapered diameter surface defining a junction between the entrance of the recess and its clearance hole to effect reduced stress concentration under clamp loading.

A better understanding of the invention will be obtained from the following detailed description and the accompanying drawing of an illustrative application of the invention.

DESCRIPTION OF THE PREFERRED EMBODIMENT

Figure 1:
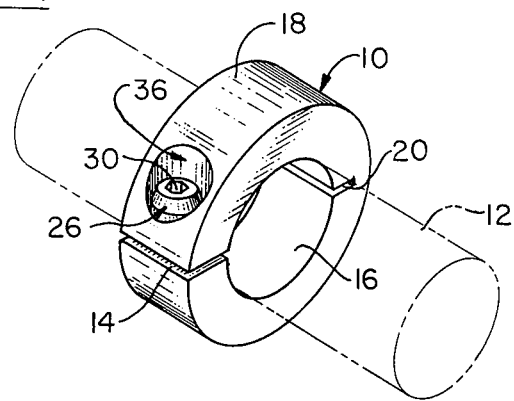
FIG. 1 is an isometric view illustrating a shaft clamping device of the general type which relates to this invention.
Figure 2:
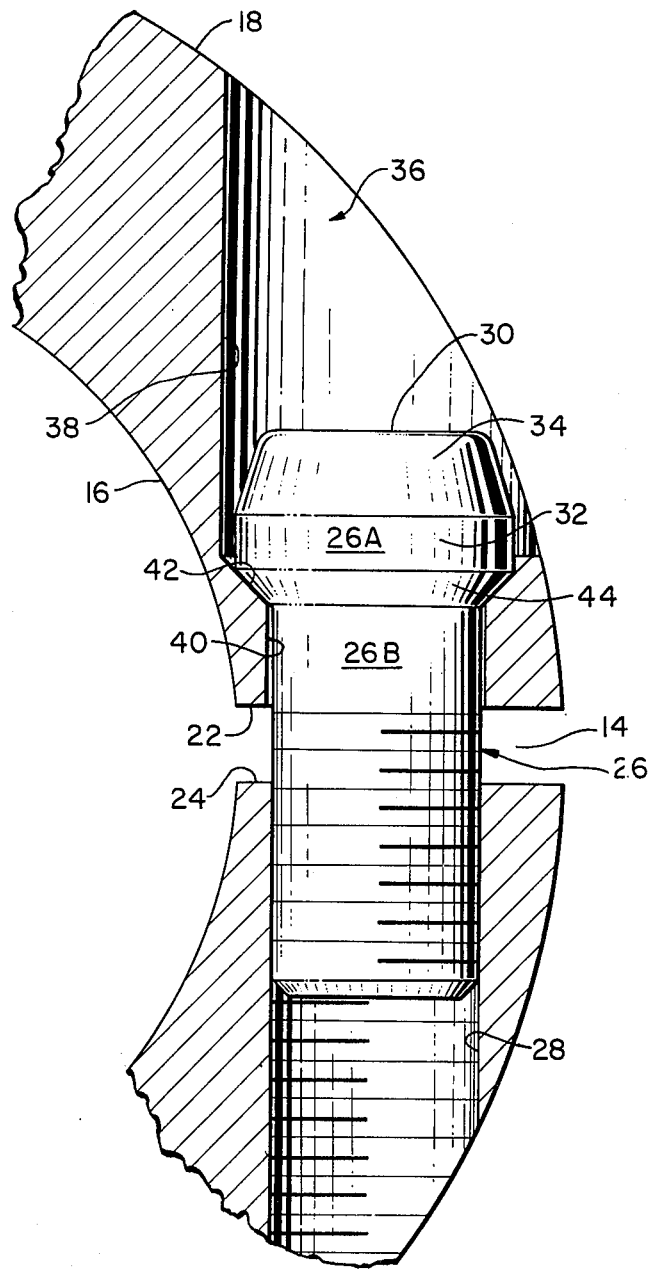
FIG. 2 is an enlarged section view, partly broken away, of the shaft clamping device incorporating this invention.

Referring to the drawing in detail, a precision collar 10 is illustrated which effects reliable radial clamping forces even under severe vibration on hardened and polished shafts such as that illustrated in broken lines at 12. Collar 10 comprises an integral annular member having at least one radial slot 14 extending from a central opening, the surrounding surface 16 of which defines the shaft clamping surface. Radial slot 14 extends from the opening through an outer wall 18 of collar 10 which will be understood to be formed of a resilient material such as steel, stainless steel or other suitable materials such as aluminum or plastic. In the specific illustrated embodiment, a second radial slot 20 is illustrated as being formed in diametrically opposed relation to slot 14. Slot 20 is shown as extending from the inside clamping surface 16 about halfway through the body of collar 10. Slot 20 can alternatively extend from the outer surface 18, to a distance of about half the collar thickness.

For effecting a clamping action to reduce the diameter of the collar clamping surface 16, collar 10 is also provided with means for drawing together opposed internal surfaces 22, 24 in confronting face-to-face relation on opposite sides of radial slot 14. This means is shown in the form of a clamping screw 26 which passes through collar 10 on one side of radial slot 14 and is in threaded engagement with a registering tapped opening 28 in collar 10 on an opposite side of the radial slot 14.

More specifically, the clamping screw 26 may be in the form of a socket head type cap screw although it is to be understood that its drive face 30 need not be limited to a conventional hexagon socket (FIG. 1) but may be of any suitable type which permits rotating the screw 26 in either of two selected angular directions. The illustrated screw 26 is preferably modified from the American National Standard Institute specifications to provide a head 26A having maximum height and head diameter dimensions of approximately 10 percent less than that of a standard screw of the same nominal shank diameter as set forth in ANSI B18.3-1976 specifications. The maximum head diameter is formed by a cylindrical side wall surface 32 of the head 26A which terminates in the reduced diameter drive face 30 as defined by an upper frustum conical head section 34. The latter is shown as having a 30° included angle formed by projections of its diametrically opposed surfaces.

To permit use of a standard size collar or even a collar of a reduced outside diameter with a screw of a nominal shank diameter specified for the standard collar to effect a desired holding power on a shaft of given diameter without requiring use of a screw of a smaller shank diameter, while yet permitting the screw head to be maintained within the collar periphery in accordance with this invention, a recess 36 is formed in the collar 10 and includes a tapered diameter surface between recess entrance 38 and screw clearance hole 40. The tapered diameter surface provides a clamping screw bearing shoulder 42 defining a junction between the recess entrance 38 and the clearance hole 40 for reduced stress concentration under loading. In the specifically illustrated embodiment, the tapered diameter surface of the bearing shoulder 42 is formed on a 45° angle relative to the axis of the coaxially aligned tapped opening 28 and recess 36. As compared to the commonly encountered conventional practice of forming a sharp 90° angle, the junction between the entrance 38 of the recess 36 and its screw clearance hole 40 is an obtuse angle of 135° to minimize stress concentration at this junction which is normally considered the weakest region of the collar 10.

The screw 26 has a tapered diameter neck 44 extending from the cylindrical side wall 32 to its shank 26B to provide a mating bearing surface conforming to and which is engageable for seating against shoulder 42 of the collar recess 36 upon turning the screw 26 to draw together confronting surfaces 22, 24 of the collar 10 on opposite sides of its radial slot 14. Accordingly, both the tapered diameter neck 44 of the screw 26 and the bearing shoulder 42 in the collar recess 36 extend at an approximately 45 degree angle to the axis of the recess 36 and tapped opening 28.

The included angle of collar shoulder 42 and under the head of the screw 26, formed by projections of their respective diametrically opposed sides, may vary relative to the 90° included angle illustrated in the preferred embodiment from, say, about 60° to about 120°. As the angle increases from the illustrated 90° included angle to 120°, the screw head 26A tends to project from the collar periphery assuming that the overall head height, the degree of taper on the upper conical section 34, the maximum head diameter and the nominal shank diameter remain unchanged. In addition under these conditions the collar 10 is gradually but increasingly weakened at the described critical junction as the included angle approaches 120°. As the included angle decreases from, say, 90° to 60°, a wedging effect may be encountered which tends to bind the neck 44 of the clamping screw head 26A to the collar shoulder 42 before the threads in the tapped opening 28 fully tension to shank 26B of the screw 26 and thereby reduces the effectiveness of the collar holding power. In addition, it is to be noted that with the 90° included angle under the head 26A as illustrated in the preferred embodiment, the angle of taper of the upper conical section 34 of the screw head preferably is not less than about 15°, thereby to minimize any possibility of the screw head 26A projecting from the collar periphery. An angle substantially more than the illustrated 15° may tend to weaken the drive face 30 and may possibly result in its bursting under stress when tightened.

By virtue of the above described construction, the shaft clamping collar 10 utilizes a minimum amount of material without having the head 26A of the screw 26 projecting from the collar periphery. Moreover, these features are embodied in a collar 10 which is substantially stronger because of the reduced stress concentration provided by the broad tapered bearing shoulder 42 for the clamping screw formed between the recess entrance 38 and clearance hold 40. Increased effectiveness of the collar holding power has been found to be provided because the collar 10 not only is stronger but additionally permits the clamping screw 26 to be safely turned to a higher loading force without failure of the assembly to effect an even greater clamping force of the collar 10 on its shaft 12.

As will be apparent to persons skilled in the art, various modifications, adaptations and variations of the foregoing specific disclosure can be made without departing from the teachings of the present invention.

I claim:

1. A shaft clamping device comprising a resilient annular collar for effecting a given holding power on a shaft of predetermined diameter and having a circular central opening and an outside collar diameter of reduced size in relation to a standard size specified for said given shaft holding power, the collar having a radial slot extending from the opening through an annular outer wall of the collar, the collar having a recess in its annular outer wall and a tapped opening coaxially aligned with the recess, the recess and tapped opening being respectively located on opposite sides of the radial slot and communicating therewith in perpendicular relation to the slot, the recess including an exposed entrance and a clamping screw clearance hole of reduced diameter relative to the entrance, the recess further including a tapered diameter surface defining a junction between the entrance of the recess and its clearance hole, the tapered diameter surface providing a clamping screw bearing shoulder effecting reduced stress concentration.

2. The device of claim 1 wherein an included angle formed by projections of diametrically opposed sides of said tapered diameter surface in the collar recess is between 60° and 120°.

3. The device of claim 1 further including a clamping screw with a threaded shank extending through said clearance hole in the collar on one side of its radial slot and threaded into the tapped opening of the collar on the opposite side of the slot, the clamping screw having a head of enlarged diameter relative to its shank diameter with a tapered diameter neck providing a mating bearing surface conforming to and seating against said shoulder of the collar recess upon turning the clamping screw to draw together confronting portions of the collar on opposite sides of its radial slot.

4. The device of claim 3 wherein the tapered diameter neck of the clamping screw and the bearing shoulder in the collar recess extend at approximately 45 degrees to the axis of the clearance hole in the collar.

5. The device of claim 3 wherein the head of the clamping screw has a height less than the shank diameter, wherein the tapered diameter neck of the clamping screw head merges with a cylindrical side wall thereof defining the maximum head diameter, wherein the head terminates in a drive face of reduced diameter relative to the maximum head diameter, and wherein the head has an upper conical side wall surface joining the cylindrical side wall and the drive face.

6. The device of claim 5 wherein the head of the clamping screw is received in its entirety within the recess of the collar and inside the periphery of its outer wall when the tapered diameter neck of the clamping screw is seated against the bearing shoulder of the collar recess.

7. The device of claim 6 wherein the outside diameter of the collar and the nominal shank diameter of the clamping screw are of specified size to effect a desired holding power on a shaft of given diameter, and wherein the collar is of a reduced outside diameter relative to said specified size and the clamping screw shank diameter is equal to said nominal specified size.

* * * * *